Patented Feb. 27, 1923.

1,446,790

UNITED STATES PATENT OFFICE.

MARY B. ELLISON, OF EUGENE, OREGON.

METHOD OF PRESSING AND UTILIZING PLANT ELEMENTS FOR DECORATIVE PURPOSES.

No Drawing. Application filed May 4, 1921. Serial No. 466,741.

*To all whom it may concern:*

Be it known that I, MARY B. ELLISON, a citizen of the United States, residing at Eugene, in the county of Lane and State of Oregon, have invented certain new and useful Improvements in Methods of Preserving and Utilizing Plant Elements for Decorative Purposes, of which the following is a specification.

This invention relates to processes for preparing plants, flowers, mosses, lichens, etc., for decorative purposes, and has for its object to provide an improved method whereby leaves, grasses, lichens, etc., may be dried without deforming them from their natural shape, and further whereby leaves, mosses, grasses, etc., may be colored so as to secure an attractive appearance and render them particularly fitted for decorative use.

In the preparation of leaves, lichens, ferns, parts of plants, etc., for decorative use, it has been common to press these parts of plants between the leaves of a book or between sheets so as to dry them. This tends to cause the parts to dry flat so that they lose their original and natural form and have, therefore, but small value for decorative purposes.

The first step in my process consists in drying those plant parts which are of leaflike form so that they shall retain their natural shape, which consists in placing the leaf, lichen, fern or other like plant part in a mass of seed or grain or sawdust to dry, by which the moisture will be evaporated from the portion of the plant without any deformation of the natural form thereof. Thus, for instance, if a fresh lichen be placed within a mass of fine seed or grain, the fine seed or grain will conform to the particular and individual contour of the lichen, and then another mass of seed or grain is poured over the upper face of the lichen or leaf so as to entirely cover the leaf, and this second and overlying mass will also conform to the individual contour of the leaf, lichen or frond and thus after the leaf, frond or lichen has dried it will have its natural contour unchanged. By this means also it is possible to dry leaves or fronds in a curved form as they would be found in nature, so that the stiffness of plant elements dried between blotting paper or between the leaves of a book is entirely lacking in plant elements which are dried in accordance with my invention. Fine leaves or the like should be given a sizing of glue to render them firm without destroying the color and then dried in fine seed to keep the natural form.

It will be noted that for the purpose of drying leaves, flowers, fronds and the like that I use seed, grain or dry sawdust. The reason for doing this is that this material is light and while it absorbs the moisture, does not press upon the plant form being dried and press it out of shape or flatten it, as sand or other relatively heavy material would do. Thus the plant forms are dried without any deformation of their natural contours.

The same process is applied to drying the seed vessels or cups of plants, the moisture being gradually evaporated while the vessel is held by the seed without any loss in natural contour or shape. After the leaf, stem, seed vessel, frond or the like has been dried, as above stated, it is to be colored, gilded, bronzed, silvered or otherwise treated to give it a proper decorative effect by painting the leaf, frond, seed vessel or other part, gilding it, silvering it or powdering it with the proper colors. This applies to relatively large forms having a considerable surface to which the paint, gilding or the like is to be applied, but with plant elements of a more fragile character, such as grasses, mosses, grass plumes, etc., it is necessary to treat them differently, and to this end I contemplate dyeing grass plumes, such as pampas grass plumes, dried grass or mosses and the like by the use of the ordinary dyes commonly found upon the market such as the "butterfly" dyes as they are known. I do not wish to limit myself, however, to butterfly dyes, as other well known dyes might be used for this purpose, nor do I wish to limit myself to dyes in connection with plumes of pampas grass or other natural flower grass or moss forms, as I contemplate the use of dyes for coloring straw flowers, that is flower forms made up of dried grasses, or to the use of dyes for use in coloring the seed heads of broom corn, cane, Japanese millet or the seed heads of other plants.

The dried and dyed, painted, gilded, bronzed or silvered plant parts such as those above noted or equivalent plant parts may be used to form ornamental bouquets, wreaths and in various decorative work whereby to transform relatively unattractive and worthless objects of nature into decorative material of more importance and attractive value, and these various plant elements may be used in conjunction to form artificial flowers, as it were, by combining them into various combinations. Thus pussywillow buds may be dyed and used with weed seed cups to form artificial flowers, the stems of which may be colored or bronzed, and these in turn may be combined with dyed moss, such as dyed live oak moss. I do not wish to be limited to any particular manner of using the dyes heretofore stated, nor to any particular variety of dye.

Tassels may be made of live oak moss and these, after drying, may be dyed to give them attractive colors and to fit them for decorative purposes. Dried and dyed moss may also be used for the preparation of moss foundation forms for wreaths, crosses or other figures which will permit the stems of natural flowers to be inserted within the moss and afterwards tied.

I claim:—

1. A method of rendering natural plant parts suitable for decorative use and preserving the natural contours of the plant part which consists in placing the plant part in a mass of fine, light particles and allowing moisture to evaporate from the plant part, thereby drying it without deflecting the plant part from its natural form.

2. A method of drying lichens, leaves, fronds, etc., which consists in placing the part to be dried upon a bed of fine, dry particles, causing the particles to conform to the natural contour of the part, and covering the part with fine, light particles to thereby dry the plant part without deformation.

3. A method of forming units for decorative purposes consisting in drying plant parts by placing the plant parts in a mass of fine, light particles which will not deform the plant part and thereby drying the plant part and then coloring the plant part.

In testimony whereof I hereunto affix my signature.

MARY B. ELLISON.